E. BARNES.
CLAMP.
APPLICATION FILED FEB. 4, 1907.

905,831.

Patented Dec. 8, 1908.

Witnesses:

Inventor
Edwin Barnes

UNITED STATES PATENT OFFICE.

EDWIN BARNES, OF SHEFFIELD, ENGLAND.

CLAMP.

No. 905,831.        Specification of Letters Patent.        Patented Dec. 8, 1908.

Application filed February 4, 1907. Serial No. 355,708.

*To all whom it may concern:*

Be it known that I, EDWIN BARNES, a subject of the King of England, residing at Sheffield, Yorkshire, in England, have invented certain new and useful Improvements in or Relating to Clamps, (for which I have made application for Letters Patent in Great Britain under No. 3,219, dated February 9, 1906,) of which the following is a specification.

This invention relates to clamps and has for its object to provide a simple construction for securely holding articles which may widely differ in size and shape.

Figure 1:
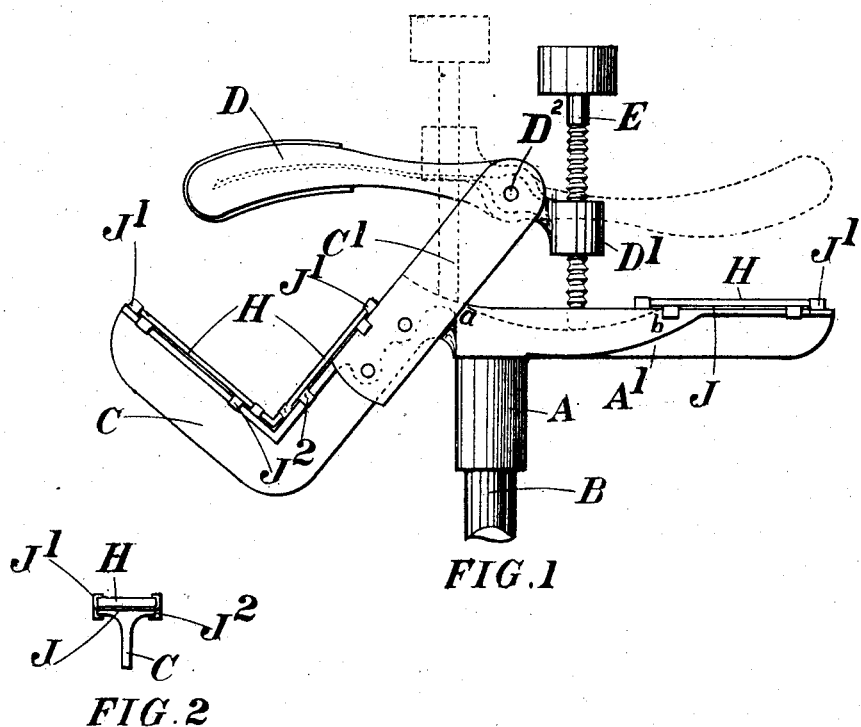
Figure 2:
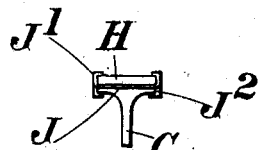
Figure 3:
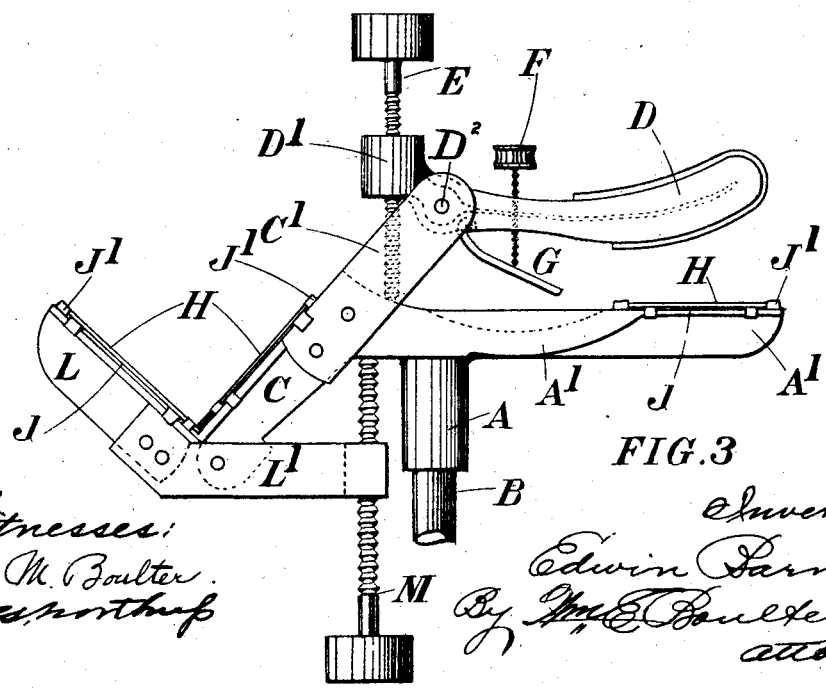

In the accompanying drawings:—Figure 1 is an elevation of a clamp according to this invention. Fig. 2 is a detail view and Fig. 3 is an elevation of a modified form of clamp.

Like letters indicate like parts throughout the drawings.

In carrying out the present invention a base A is provided which may be attached to a rod B as shown in the drawings, springing from a suitable pedestal or otherwise as desired. An angular piece C $C^1$ is secured to or formed on the base A, the angle being preferably not greater than about 120°. A lever or arm D $D^1$ is pivoted at $D^2$ to the end $C^1$ of the angular piece and is situated in the same plane as the latter. It is so arranged that the end D, which is conveniently rounded as shown, is adapted to enter into the angle referred to. The other end $D^1$ of the lever, beyond its fulcrum $D^2$, is provided with a screw threaded hole with which a screw E engages, and by causing the end of this screw to come into contact with the base A or an extension $A^1$ thereof it will be seen that the end D of the lever D $D^1$ may be moved into the angle, and that any article inserted therein may thus be firmly held. That part of the extension $A^1$ with which the screw E comes into contact is preferably curved as shown between the points $a$ and $b$ so that the screw is always approximately normal thereto when this clamp is in operation. It is preferred to make either the angular piece C $C^1$, or the lever D $D^1$, or both, of a certain thickness sufficient to provide bearing surfaces far enough apart to properly support an article in the clamp. These parts may both be made of two similarly shaped pieces of sheet metal separated by distance pieces, or they may be cast in the desired shape or otherwise formed as desired.

In the construction shown in Fig. 1 the base A, extension $A^1$ and arm C of the angular piece are all made in one, and the arm $C^1$ of the angular piece is formed by two pieces of metal riveted or otherwise secured in place, thus making this part forked so that the lever D $D^1$ may be pivoted within the fork. The part C of the angular piece and the end of the extension $A^1$ are conveniently made of T-section metal while the arm D is of H-section, although other shapes and methods of constructing these parts may be employed. The extension $A^1$ may be utilized as one member of a second clamp on the same base, by removing the screw E, turning the lever D $D^1$ round into the position shown in dotted lines in Fig. 1 and in full lines in Fig. 3 and re-inserting the screw. The extension $A^1$ may either be as shown, or it may contain an angle similar to that of the piece C $C^1$, or the lever D $D^1$ may be angular.

In order to more securely hold articles by providing means for applying pressure at different points an additional screw F may be provided in the arm D or other convenient part of the clasp and this screw may be either used to bear directly on the article to be held or it may force a lever G pivoted to a convenient part of the clamp into contact with the article.

It is preferred to cover those parts of the clamps between which an article is held with cork, rubber or like material to prevent damage. Where the parts are of H- or similar section these bearing surfaces may be provided by simply forcing the cork or other material between the side flanges. In other cases it is preferred to use clips made from pieces of sheet metal J having one or more sets of ears $J^1$ which are bent over the cork H or other material, and another set of ears $J^2$ which are bent over the edges of the clamp as shown in Figs. 1 and 3 and in Fig. 2 which is an end view of the member C with the cork secured thereto by one of these clips.

That part of the angular piece opposite the lever D $D^1$ may itself be pivoted as shown in Fig. 3, where the part C only reaches to the beginning of the angle, which is completed by an arm or lever L $L^1$ pivoted to this part C at $L^2$. The lever L $L^1$ is constituted by a T-section part L and by two pieces of metal $L^1$ which are riveted or otherwise secured at one end to the web of the part L and at the other end are separated by a distance piece which is provided with a screw threaded hole in which a screw M is situated. The end of the screw M bears against a part of the base or member C and it will be appreciated that the angle between the parts L and C C¹ may be varied by adjusting this screw. In other respects the operation of this clamp is similar to that described with reference to Fig. 1. The construction of the lever L L¹ may be varied as desired without departing from this invention.

As a modification the end D¹ of the lever may be shaped similarly to its end D and the lever be provided with a screw such as E on each side of its fulcrum so that it will be unnecessary to turn the lever round to hold an article against the extension A¹ after using the angular piece C C¹, or C C¹ L L¹. The dotted lines in Fig. 1 also represent the appearance of such a lever.

Instead of the screws E and M engaging threaded holes in the parts D¹ and L¹, they may pass through slots in these parts and engage screw threaded holes in the base A, or, preferably, in lugs pivoted or hinged thereto.

The angular member may be pivoted and the other member be fixed to the base or they may both be pivoted to the base or to one another.

The sides of the angle and the extension A¹ may be curved if desired and the angle itself may be constituted by a curve the term "angle" in this specification and in the claims hereto being used with the intention of including such constructions.

What I claim as my invention and desire to secure by Letters Patent is:—

1. In a clamp the combination of two members, one of which is angular, means for causing the members to approach one another and hold an article in said angle, an extension of one member, and means for causing the other to approach such extension, the two members forming one clamp while the extension and the other member form interchangeably another.

2. The combination of a base, a member comprised of two arms at an angle to each other attached thereto said member comprising a rigid portion having a two armed lever pivoted at one end of the rigid portion, a set screw in one of said arms bearing against the base, a pivoted member at the other end of the rigid portion of said two-armed member, and a set screw in said pivoted member bearing against the base substantially as set forth.

3. The combination of a base, a member comprised of two arms at an angle to each other attached thereto said member comprising a rigid portion having a two armed lever pivoted at one end of the rigid portion, a set screw in one of said arms bearing against the base, a pivoted member at the other end of the rigid portion of said two-armed member, a set screw in said pivoted member bearing against the base and an extension on the base, the two-armed and pivoted members forming one clamp and said pivoted member and the extension forming interchangeably another clamp substantially as set forth.

4. The combination of a base, a member comprised of two arms at an angle to each other attached thereto, a pivoted member at one end of one of said arms, a set screw in said pivoted member bearing against the base and an extension on the base, the two-armed and pivoted members forming one clamp while the same pivoted member and the extension form interchangeably another clamp, substantially as set forth.

5. The combination of a base, a member comprised of two arms at an angle to each other attached thereto, a pivoted member at one end of one of said arms, a set screw in said pivoted member bearing against the base, an extension on the base, a lever on the pivoted member and a set screw in the pivoted member bearing against said lever, the two-armed and pivoted members forming one clamp while the same pivoted member and the extension form interchangeably another clamp, substantially as set forth.

6. The combination of a base, a member comprised of two arms at an angle to each other attached thereto, a pivoted member at one end of one of said arms, a set screw in said pivoted member bearing against the base, an extension on the base, a lever on the pivoted member, a set screw in the pivoted member bearing against said lever, the two-armed and pivoted members forming one clamp while the same pivoted member and the extension form interchangeably another clamp, and yielding material on the bearing surfaces of said clamps attached thereto by clips having one set of ears bent over the yielding material and another set of ears bent over the edges of the clamps substantially as set forth.

7. The combination of a base, a member comprised of two arms at an angle to each other attached thereto, said member comprising a rigid portion having a two armed lever pivoted at one end of the rigid portion, a set screw in one of said arms bearing against the base, a pivoted member at the other end of the rigid portion of said two-armed member, a set screw in said pivoted member bearing against the base, an extension on the base, a lever on the pivoted member and a set screw in the pivoted member bearing against said lever, the two-armed and pivoted members forming one clamp while the same pivoted member and the extension form interchangeably another clamp substantially as set forth.

8. The combination of a base, a member comprised of two arms at an angle to each other attached thereto, said member comprising a rigid portion having a two armed lever pivoted at one end of the rigid portion, a set screw in one of said arms bearing against the base, a pivoted member at the other end of the rigid portion of said two-armed member, a set screw in said pivoted member bearing against the base, an extension on the base, a lever on the pivoted member, a set screw in the pivoted member bearing against said lever, the two-armed and pivoted members forming one clamp while the same pivoted member and the extension form a second clamp, and yielding material on the bearing surfaces of said clamps attached thereto by clips having one set of ears bent over the yielding material and another set of ears bent over the clamps substantially as set forth.

9. In a clamp the combination of a clamping member, a second clamping member having a pivotal connection with the first clamping member and comprising two arms at an angle to each other, means for adjusting the inclination of said arms, and means for causing both clamping members to approach each other and hold an article in the angle between the said arms.

In testimony whereof I have signed my name to this specification in the presence of two subscribing witnesses.

EDWIN BARNES.

Witnesses:
ARTHUR M. GREENWOOD,
CHAS. N. DANIELS.